United States Patent
Charrat et al.

(10) Patent No.: US 7,098,770 B2
(45) Date of Patent: Aug. 29, 2006

(54) CONTACTLESS INTEGRATED CIRCUIT READER

(75) Inventors: Bruno Charrat, Aix en Provence (FR); François Lepron, Saint Cannat (FR)

(73) Assignee: Inside Technologies, Saint Clement Les Places (FR)

( * ) Notice: Subject to any disclaimer, the term of this patent is extended or adjusted under 35 U.S.C. 154(b) by 355 days.

(21) Appl. No.: 10/411,008

(22) Filed: Apr. 10, 2003

(65) Prior Publication Data

US 2003/0169152 A1  Sep. 11, 2003

Related U.S. Application Data

(63) Continuation of application No. PCT/FR01/03078, filed on Oct. 5, 2001.

(30) Foreign Application Priority Data

Oct. 16, 2000 (FR) .................................. 00 13198

(51) Int. Cl.
    *H04Q 5/22* (2006.01)
(52) U.S. Cl. .................. 340/10.1; 340/10.3; 340/10.5; 340/825.63; 340/825.72; 340/825.69; 340/10.34; 340/10.4; 340/505; 340/572.1; 340/572.2; 340/572.7
(58) Field of Classification Search .............. 340/10.1, 340/10.3, 10.5, 825.63, 825.72, 825.69, 10.34, 340/10.4, 505, 572.1, 572.2, 572.7; 235/444, 235/462.46, 462.49, 449
See application file for complete search history.

(56) References Cited

U.S. PATENT DOCUMENTS 5,877,926 A * 3/1999 Moisin ......................... 361/42
6,329,808 B1 * 12/2001 Enguent ................... 324/76.77

FOREIGN PATENT DOCUMENTS

| FR | 2 791 493 A1 | 9/2000 |
| WO | WO 98/08311 A1 | 2/1998 |
| WO | WO 00/59108 A1 | 10/2000 |
| WO | WO 00/59128 A1 | 10/2000 |

* cited by examiner

*Primary Examiner*—Wendy R. Garber
*Assistant Examiner*—Vernal Brown
(74) *Attorney, Agent, or Firm*—Akin Gump Strauss Hauer & Feld, LLP (57) ABSTRACT

The present invention relates to a contactless integrated circuit reader operating by inductive coupling, comprising an antenna circuit for sending an alternating magnetic field, circuits for applying an alternating excitation signal to the antenna circuit and circuits for modulating the amplitude of an antenna signal present in the antenna circuit according to data to be sent. The reader includes circuits for simulating the operation of a contactless integrated circuit, arranged to inhibit the application of the excitation signal to the antenna circuit and to apply a load modulation signal to the antenna circuit when data is to be sent. The load modulation signal is capable of disturbing a magnetic field sent by another contactless integrated circuit reader and of being detected by the other contactless integrated circuit reader.

47 Claims, 4 Drawing Sheets

CONTACTLESS INTEGRATED CIRCUIT READER

CROSS-REFERENCE TO RELATED APPLICATIONS

This application is a continuation of International Application No. PCT/FR01/03078, filed Oct. 5, 2001, the disclosure of which is incorporated herein by reference.

BACKGROUND OF THE INVENTION

The present invention relates to contactless integrated circuit readers and data transmission by inductive coupling.

Figure 1:
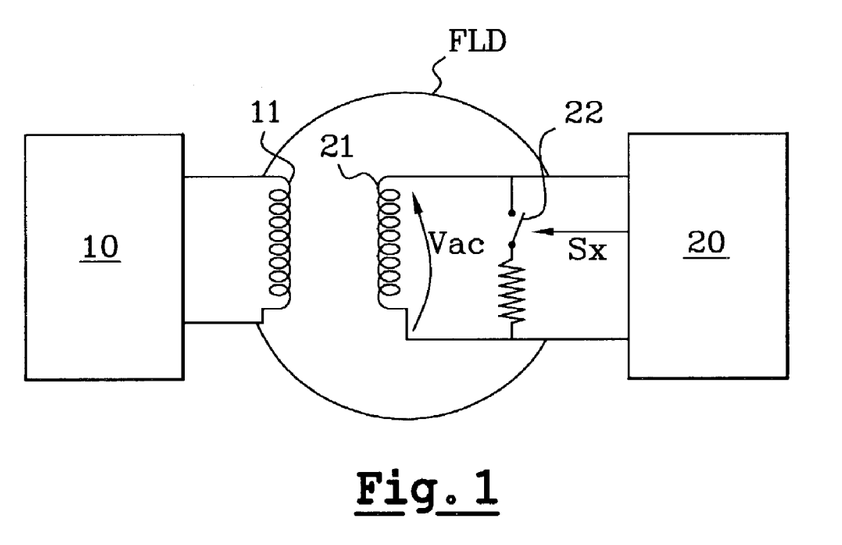
FIG. 1, previously described, schematically represents a contactless integrated circuit reader and a contactless integrated circuit.
Figure 2:
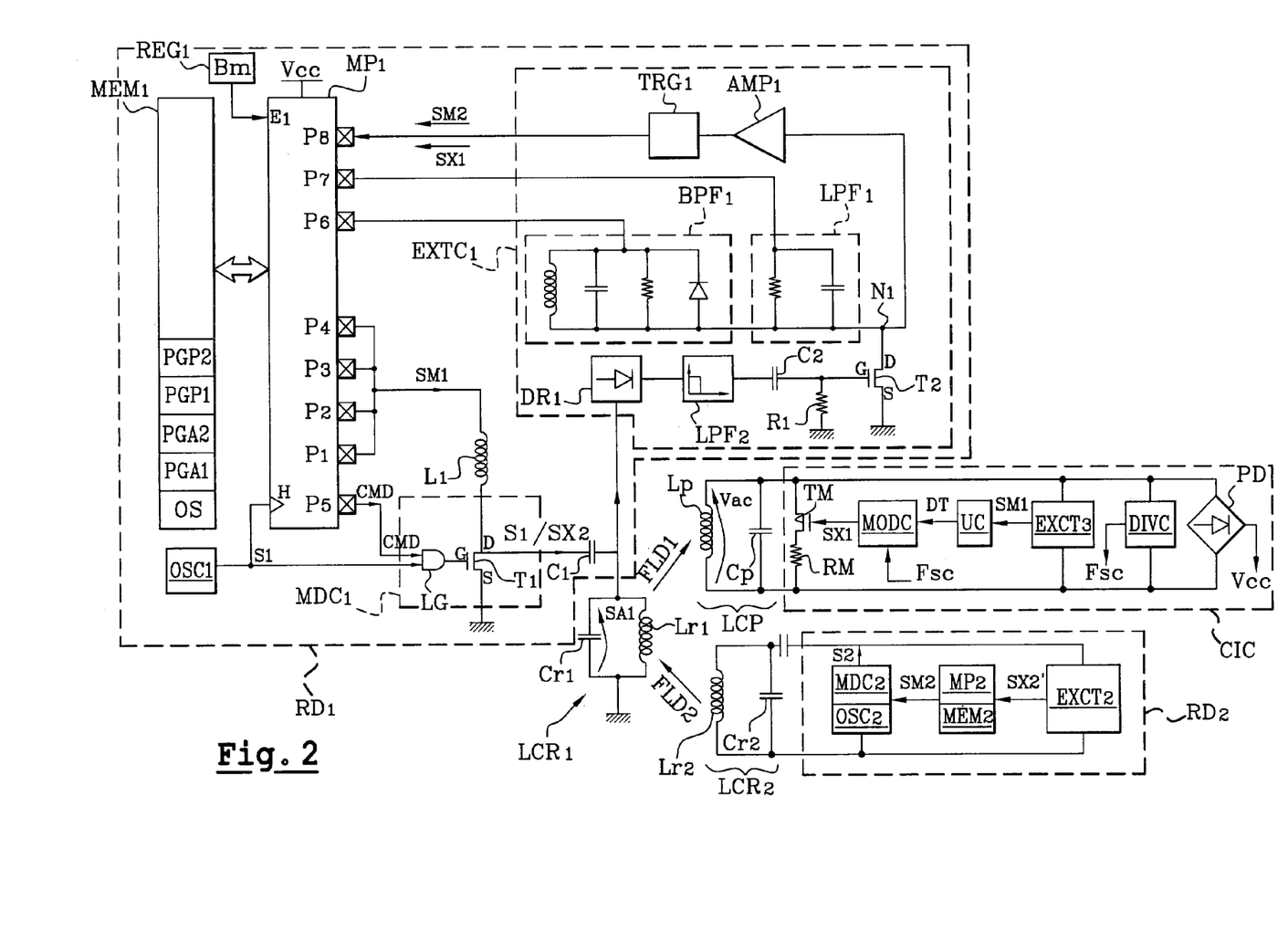
FIG. 2 is the wiring diagram of an example of an embodiment of a reader according to the present invention.

As represented schematically in FIG. 1, a contactless integrated circuit reader 10 operating by inductive coupling is an active system that sends an alternating magnetic field FLD by means of an antenna circuit 11 and that sends data by modulating the amplitude of the magnetic field sent. Conversely, a contactless integrated circuit 20 is a passive device that does not send a magnetic field and comprises an antenna circuit 21 comparable by analogy to the secondary winding of a transformer the primary winding of which would be constituted by the antenna circuit 11 of the reader. The magnetic field FLD sent by the reader causes an induced alternating voltage Vac to appear in the antenna circuit of the integrated circuit, said induced voltage copying the amplitude modulations of the magnetic field and enabling the integrated circuit 10 to receive the data sent by the reader, after filtering and demodulating the induced voltage Vac. Furthermore, a contactless integrated circuit 20 sends data to such a reader by load modulation, i.e. by short-circuiting its antenna circuit by means of a switch driven by a load modulation signal Sx. The antenna short-circuits cause a disturbance of the magnetic field FLD that is passed onto the antenna circuit of the reader 10. The latter can therefore extract the load modulation signal Sx by filtering the signal present in its antenna circuit 11 and deduce the data sent by the contactless integrated circuit from it.

With reference for example to the ISO standards 14443-2/A or 14443-2/B or ISO 1569, designated hereafter "ISO/A", "ISO/B" and "ISO15", the antenna circuit of a contactless reader is excited by an alternating signal of a frequency of 13.56 MHz, the data transmission to a contactless integrated circuit is carried out by modulating the amplitude of the magnetic field with a modulating trough of 100% (ISO/A), of 10% (ISO/B) or of 10% to 30% (ISO15). The data transmission to a reader is carried out by load modulation by means of a sub-carrier of 847 KHz that is Manchester coded (standard ISO/A) or biphase shit keying (BPSK) coded (standard ISO/B) or by means of a sub-carrier of 423 KHz that is Manchester or frequency shift keying (FSK) coded (IS015).

The applications of this data transmission technique by inductive coupling are currently increasing, particularly in the fields of electronic payment and access control (smart cards and electronic badges) and in product identification (electronic tags). The contactless integrated circuits are arranged on portable supports (plastic cards, tag supports) having an antenna coil integrated therein. The antenna coil is sometimes integrated directly into the silicon wafer of the integrated circuits ("coil on chip"), in so-called "proximity" applications in which the maximum distance of communication is short and on the order of a few millimetres.

In many applications, the contactless integrated circuit readers are in the form of fixed terminals. However, these contactless terminals are capable of recording different pieces of information relating to the operations carried out, which are sometimes necessary to collect to correctly manage the installations. Thus, an access control terminal is capable of recording each time the door opens, the date, the time and the identity of the badge with which the opening of the door was requested. Similarly, an automatic payment terminal is capable of recording the time of each transaction and the identity of the card with which payment was made. In the applications that involve several terminals, it is sometimes desirable for this information to be collected by a data centralization system. To collect the information recorded, it is therefore necessary to provide an infrastructure of electric cables enabling the centralization system to be connected to each of the terminals. In other applications, the reading of the data recorded by a terminal is done manually by means of a terminal reader comprising a connector that is inserted into an output port of the terminal.

These various operations of reading data in fixed terminals prove to be tedious when they are done manually or costly when they require an infrastructure of electric cables.

The present invention aims to overcome this disadvantage.

BRIEF SUMMARY OF THE INVENTION

More particularly, one object of the present invention is to provide a simple means of reading data recorded by a contactless integrated circuit reader.

To achieve this object, one idea of the present invention is to provide a contactless integrated circuit reader capable of switching to a passive operating mode in which the reader does not send a magnetic field and operates with regard to another reader like a contactless integrated circuit. In other terms, this reader is capable of sending data to another reader according to the load modulation principle, and of receiving data that the other reader sends by modulating the magnetic field it sends out.

Because of the present invention, it is possible to cause two contactless readers to "converse" or communicate by switching one of the two readers to the passive operating mode. Data can then be exchanged without any mechanical contact between the two readers. The first reader is for example a fixed terminal in which data must be read and the second reader is for example a portable reader used to extract the data from the terminal at the end of the day.

Furthermore, in applications in which several terminals are close to each other, each terminal can switch to a passive mode to send or receive data to or from a neighbouring terminal, and can therefore be used as a relay for the propagation of data from terminal to terminal.

In this context, another object of the present invention is to provide a method for transferring data between two readers according to the load modulation principle, that is simple to implement and does not require providing a load modulation switch capable of short-circuiting the antenna circuit of one of the two readers.

One particular object of the present invention is to make a contactless integrated circuit reader of the type described in the international applications PCT/FR00/00742 and PCT/FR00/00712 operate in passive mode, by minimizing the material modifications to be made to this reader to obtain the desired result.

For that purpose, another idea of the present invention is to apply a load modulation signal with two states to the antenna circuit of a first reader, the variations of the signal being capable of disturbing the magnetic field sent by a second reader and of causing the equivalent of a load modulation obtained by short-circuiting the antenna circuit of the first reader in the antenna circuit of the second reader.

Therefore, the present invention provides an inductive coupling data send-receive device comprising an antenna circuit, means for delivering an alternating signal for exciting the antenna circuit, and means for simulating the operation of a contactless integrated circuit. The components are arranged for applying a load modulation signal with two states to the antenna circuit when data is to be sent. The load modulation signal is capable of disturbing a magnetic field sent by a contactless integrated circuit reader and of being detected by the reader as if it were a load modulation signal sent by a contactless integrated circuit.

According to one embodiment, the load modulation signal comprises pulses of the excitation signal. The duration of each pulse is longer than the period of the excitation signal.

According to another embodiment, the load modulation signal comprises groups of pulses of the excitation signal. The pulses of a single group are sent at a determined frequency lower than the frequency of the excitation signal.

According to another embodiment, the load modulation signal alternates between the following two states: the logic "0", i.e. a reference potential, and the high impedance state.

According to another embodiment, the load modulation signal alternates between the following two states: the logic "0", i.e. a reference potential, and the logic "1", i.e. a direct voltage.

According to another embodiment, the load modulation signal is controlled by at least one port of a microprocessor.

According to another embodiment, the device comprises an active operating mode in which the excitation signal is applied in a substantially constant manner to the antenna circuit and in which data are sent by modulating the amplitude of the magnetic field sent by the antenna circuit. The device is capable of conversing with a contactless integrated circuit when it is in the active mode. The device also includes a passive operating mode in which data is sent by applying the load modulation signal with two states to the antenna circuit using the means for simulating the operation of a contactless integrated circuit. The device is capable of conversing with a contactless integrated circuit reader when it is in the passive mode.

In passive operating mode, the means for simulating the operation of a contactless integrated circuit are preferably arranged to inhibit the substantially constant application of the excitation signal to the antenna circuit, at least when the load modulation signal is not applied to the antenna circuit.

According to another embodiment, the inhibition of the application of the excitation signal to the antenna circuit is controlled by ports of a microprocessor.

According to another embodiment, the device comprises means for extracting a load modulation signal sent by a contactless integrated circuit from an antenna signal present in the antenna circuit and means for extracting an amplitude modulation signal sent by a contactless integrated circuit reader from the antenna signal.

According to another embodiment, the means for extracting an amplitude modulation signal and the means for extracting a load modulation signal comprise a common filter circuit linked to the antenna circuit.

The present invention also relates to a method for transferring data between two contactless integrated circuit readers operating by inductive coupling. Each reader comprises an antenna circuit for sending an alternating magnetic field, means for applying an alternating excitation signal to the antenna circuit, and means for modulating the amplitude of the magnetic field sent. The method comprising the steps of providing, at least in a first reader, means for simulating the operation of a contactless integrated circuit and making the first reader operate like a contactless integrated circuit.

According to another embodiment, the method comprises the steps of applying a load modulation signal to the antenna circuit when data are to be sent, the load modulation signal being capable of disturbing the magnetic field sent by the other reader and of being detected by the other reader, and inhibiting the application of the excitation signal to the antenna circuit at least when the load modulation signal is not applied.

According to another embodiment, the load modulation signal comprises pulses of an alternating signal. The duration of each pulse is longer than the period of the alternating signal.

According to another embodiment, the load modulation signal comprises groups of pulses of the excitation signal. The pulses of a single group are sent at a determined frequency lower than the frequency of the excitation signal.

According to another embodiment, the load modulation signal alternates between the following two states: the logic "0", i.e. a reference potential, and the high impedance state.

According to another embodiment, the load modulation signal alternates between the following two states: the logic "0", i.e. a reference potential, and the logic "1", i.e. a direct voltage.

According to another embodiment, the method comprises a step of providing filter means in the reader operating like a contactless integrated circuit. The filter means are capable of extracting a load modulation signal sent by a contactless integrated circuit from the antenna signal of the reader and of extracting an amplitude modulation signal sent by the other contactless integrated circuit reader from the antenna signal.

The present invention also relates to a method for sending data to a contactless integrated circuit reader by means of a device comprising an antenna circuit and means for delivering an alternating signal for exciting the antenna circuit. The method comprises the step of applying a load modulation signal with two states to the antenna circuit. The load modulation signal is capable of disturbing a magnetic field sent by a contactless integrated circuit reader and of being detected by the reader as if it were a load modulation signal sent by a contactless integrated circuit.

According to another embodiment, the load modulation signal comprises pulses of the excitation signal. The duration of each pulse is longer than the period of the excitation signal.

According to another embodiment, the load modulation signal comprises groups of pulses of the excitation signal. The pulses of a single group are sent at a determined frequency lower than the frequency of the excitation signal.

According to another embodiment, the load modulation signal alternates between the following two states: the logic "0", i.e. a reference potential, and the high impedance state.

According to another embodiment, the load modulation signal alternates between the following two states: the logic "0", i.e. a reference potential, and the logic "1", i.e. a direct voltage.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIG. 1 is the wiring diagram of a reader RD1 according to the present invention, initially provided to exchange data with a contactless integrated circuit. Therefore, in terms of its general characteristics, the architecture of the reader RD1 is in itself well known and is described in the international applications PCT/FR00/00742 and PCT/FR/00712.

The reader RD1 can be essentially distinguished from the classical reader in that it comprises means for switching to a passive operating mode in which it simulates the operation of a contactless integrated circuit to converse or communicate with another contactless integrated circuit reader.

In the following description, the reader RD1 will be described, without limitation, with reference to the standards ISO/A and ISO/B, the characteristics of which were set forth in the Background of the Invention section. Thus, the filter cut-off frequencies, the signal oscillation frequencies and the coding protocols mentioned below are only given as examples.

The reader RD1 classically comprises a microprocessor MP1, a memory MEM1, an external antenna circuit LCR1, an oscillator OSC1, an amplitude modulation circuit MDC1 and a data extraction circuit EXTC1. The antenna circuit LCR1 comprises a coil Lr1 and a capacitor Cr1 in parallel and has a resonance frequency of about 13.56 MHz. The oscillator OSC1 delivers an excitation signal SI of a frequency of about 13.56 MHz that is applied to the antenna circuit LCR1 through the modulation circuit MDC1. The signal S1 is also applied to the microprocessor as a clock signal H.

The microprocessor MP1 is supplied by a direct voltage Vcc and comprises ports P1 to P8 that can be set to "0" (ground), to "1" (Vcc) or to the high impedance state (HZ). Here, the ports P1 to P7 are output ports while the port P8 is an input port.

The memory MEM1 comprises a non-volatile area, such as a read only memory (ROM) or an electronically erasable programmable read only memory (EEPROM)-type area for example, in which various classical programs are logged, particularly the operating system OS of the microprocessor, a program PGA1 for managing a protocol to send data by amplitude modulation and a program PGA2 for managing a protocol to receive data sent by a contactless integrated circuit according to the load modulation principle.

According to the present invention, the memory MEM1 also comprises a program PGP1 for managing a protocol to receive data sent by another contactless integrated circuit reader (by modulating the amplitude of an external magnetic field), and a program PGP2 for managing a protocol to send data by load modulation. These programs enable the reader RD1 to operate in passive mode and use data send-receive protocols provided for contactless integrated circuits.

The modulation circuit MDC1 comprises a transistor T1, here of the negative-channel metal oxide semiconductor (NMOS) type, the gate of which receives the signal S1 and the source of which is connected to the ground. The drain of the modulation transistor T1 is linked to the antenna circuit LCR1 through a capacitor C1 and is linked to the ports P1 to P4 of the microprocessor MP1 through an inductor or "shock" inductor L1. According to the present invention, the signal S1 is applied to the gate of the modulation transistor T1 through a logic gate LG, here an AND gate, receiving the signal S1 and a control signal CMD delivered by the output port P5 of the microprocessor MP1.

The data extraction circuit EXTC1 comprises a band-pass filter BPF1 set to a frequency of about 847 KHz and a low-pass filter LPF1 having a cut-off frequency of about 847 KHz. The band-pass filter BPF1 comprises for example an inductor, a capacitor, a resistor and a diode in parallel, and the low-pass filter LPF1 comprises a resistor and a capacitor in parallel. Each filter BPF1, LPF1 is connected by one of its ends to a port P6, P7 of the microprocessor MP1, respectively. The other end of the filters BPF1, LPF1 is connected to a common node N1 that is connected to the output of an amplifier element T2. The amplifier element T2, as shown here, is a transistor T2 of the FET type, the drain of which is connected to the node N1 and the source of which is connected to the ground. Furthermore, the node N1 is linked to the port P8 of the microprocessor MP1 through an amplifier AMP1 and a trigger TRG1 transforming a signal delivered by the amplifiers BPF1, LPF1. The data extraction circuit EXTC1 also comprises a half-wave rectifier DR1 and a low-pass filter LPF2 having a cut-off frequency on the order of about 1 MHz. The half-wave rectifier DR1 is connected to the antenna circuit LCR1 and its output is applied to the input of the low-pass filter LPF2. The output of the filter LPF2 is applied to the input of the amplifier element T2 (here the gate of the field-effect transistor FET) through a decoupling capacitor C2 and a pull-down resistor R1.

The operation of the reader RD1 in active mode and the operation of the reader in passive mode will be described hereinafter.

Operation in Active Mode:

The operation of the reader RD1 in active mode is classical in itself and comprises first of all sending a magnetic field FLD1. The ports P1 to P4 of the microprocessor MP1 are-set to 1 and the signal CMD is set to 1. The output of the circuit MDC1 delivers the excitation signal S1 to the antenna circuit LCR1 and an antenna signal SA1 of the same frequency appears in the antenna circuit LCR1, causing the magnetic field FLD1 intended to activate a contactless integrated circuit to be sent.

An exemplary contactless integrated circuit CIC is represented as in FIG. 1 opposite the reader RD1. The circuit CIC can be an integrated circuit of a contactless smart card, of a contactless electronic badge, of a contactless electronic tag, etc. The circuit CIC is equipped with an antenna circuit LCP comprising a coil Lp in parallel with a capacitor Cp. It comprises a load modulation switch TM, here an NMOS transistor, a hard-wired logic or microprocessor central processing unit UC, a modulator circuit MODC (the output of which drives the gate of the transistor TM), a data extraction circuit EXTC3 connected to the antenna circuit LCP, a diode rectifier PD and a frequency divider circuit DWVC. The switch TM is connected to the terminals of the antenna circuit LCP through a load resistor RM.

The magnetic field FLD1 sent by the reader RD1 causes an induced voltage Vac to appear at the terminals of the coil Lp. The voltage Vac is rectified by the diode bridge PD. The output of the diode bridge PD delivers a supply voltage Vcc of the circuit CIC. Moreover, the oscillation frequency of about 13.56 MHz of the voltage Vac is divided by the circuit DIVC, the output of which delivers a sub-carrier Fsc of about 847 KHz sent to the circuit MODC.

The exchange of data between the reader RD1 and the circuit CIC is shown by FIGS. 3A to 3D. The left-hand side of these figures relates to sending data to the circuit CIC (send mode) and the right-hand side relates to receiving data sent by the integrated circuit (receiving mode).

Figure 3A:
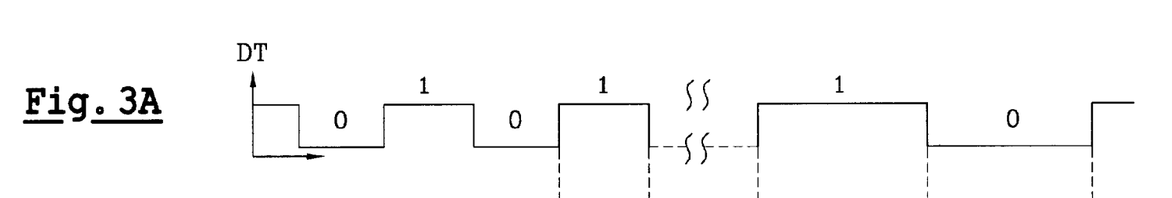
FIGS. 3A to 3D are timing diagrams of electric signals showing the operation of the reader in active mode, during a communication with a contactless integrated circuit.
Figure 3B:
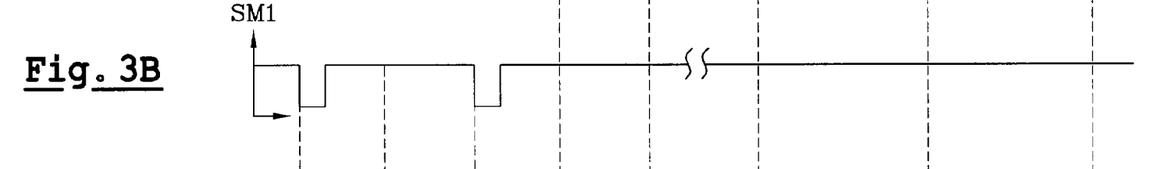
Figure 3C:
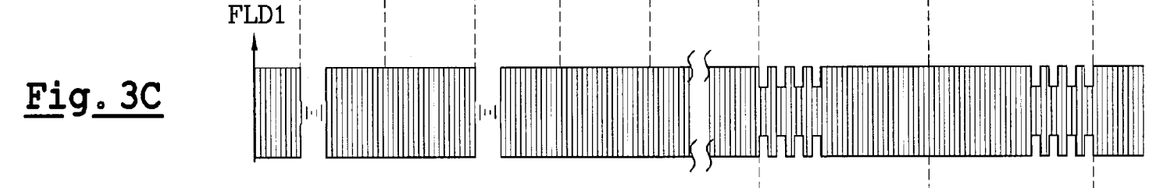

A—Sending Data to the Integrated Circuit:

When data DT is to be sent to the circuit CIC, the microprocessor MP1 of the reader RD1 delivers an amplitude modulation signal SM1 coded according to a determined protocol by means of the ports P1 to P4. FIG. 3A, shows an example of data DT to be sent and an example of coding of the signal SM1 is represented in FIG. 3B. Classically, this coding involves temporarily setting the signal SM1 to 0 when a 0 is sent, and maintaining the signal SM1 at 1 when a 1 is sent. The change of the signal SM1 to 0 blocks the transistor T1 in the circuit MDC1 and extinguishes the antenna signal SA1, because the excitation signal S1 no longer being applied to the antenna circuit LCR1. The magnetic field FLD1, represented in FIG. 3C, thus has a short amplitude modulation when a bit on 0 is sent and has no amplitude modulation when a bit on 1 is sent (pulse coding). As described in the applications PCT/FR00/00742 and PCT/FR/00712, the modulation trough is of 100% (ISO/A coding) when all the ports P1 to P4 are set to 0 but may also be lower than 100%, such as 10% for example (ISO/B standard), by setting certain ports P1 to P4 to the high impedance state HZ while the others remain on 1 (instead of setting all the ports to 0).

In the circuit CIC, the amplitude modulation signal SM1 is extracted from the induced voltage Vac by the circuit EXTC3, and is applied to the central processing unit UC for decoding received data DT.

Figure 3D:
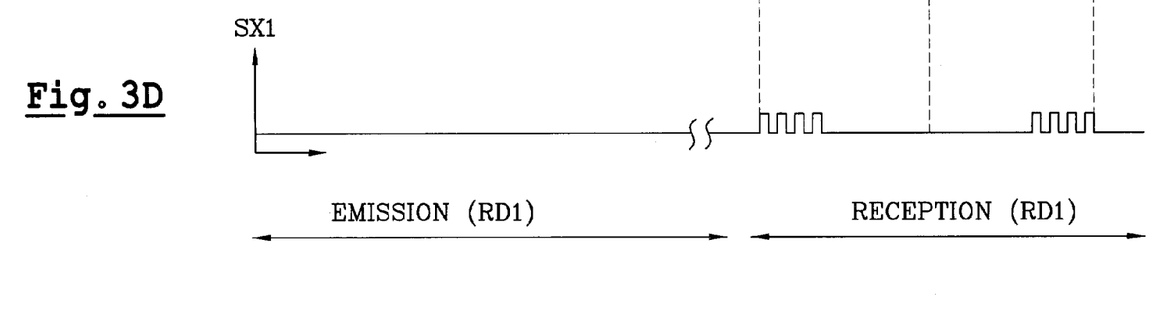

B—Receiving Data Sent by the Integrated Circuit:

It will be assumed here that the integrated circuit sends data DT (FIG. 3A, right-hand side) to the reader RD1. Data DT is applied to the circuit MODC to be coded in accordance with the chosen protocol, and the circuit MODC applies a load modulation signal SX1 to the gate of the transistor TM. As represented in FIG. 3D, the signal SX1 is for example the result of Manchester coding applied to the sub-carrier Fsc (standard ISO/A). The signal SX1 may also be the result of BPSK coding applied to the sub-carrier Fsc (standard ISO/B).

In the reader RD1, the function of the ports P6 and P7 is to switch the filters BPF1, LPF1 while ensuring their electric power supply. When the ports P6, P7 are on high impedance, the filters BPF1, LPF1 are disconnected (in open circuit) and the node N1 is at high impedance HZ. When a port P6, P7 is set to 1 while the other port is maintained at high impedance HZ, the corresponding filter BPF1, LPF1 is put into operation. Therefore, the microprocessor MP1 selects and activates the low-pass filter LPF1 by means of the port P7 when the signal SX1 is Manchester coded (standard ISO/A) or selects the band-pass filter BPF1 by means of port P6 when the signal SX1 is BPSK coded.

The load modulation signal SX1 is first of all extracted from the antenna signal SA1 by the low-pass filter LPF2 of the circuit EXTC1, which eliminates the component at 13.56 MHz, and is applied to the input of the amplifier element T2. The filter BPF1 or LPF1 selected by means of the ports P6, P7 enables the envelope of the signal SX1 to be extracted, by eliminating the sub-carrier Fsc. The envelope of the signal SX1 is sent to the port P8 of the microprocessor to be decoded, after being amplified by the amplifier AMP1 and transformed by the trigger TRG1.

Generally speaking, the low-pass filter LPF1 enables any type of signal SX1 the frequency of which is lower than or equal to about 847 KHz to be frequency demodulated, including when the signal, SX1 is a binary signal without sub-carrier. The band-pass filter BPF1 is more particularly dedicated to the phase demodulation of the signal SX1 when the latter is phase jump coded (BPSK) and has a frequency of about 847 KHz.

Operation in Passive Mode:

An object of the present invention is to simulate the operation of a contactless integrated circuit by means of the reader RD1, so as to enable data to be exchanged between the reader RD1 and another contactless integrated circuit reader.

As an example, another reader RD2 is represented schematically in FIG. 1, opposite the reader RD1. The reader RD2 is here of the same structure as the reader RD1 and comprises an antenna circuit LCR2 made up of a coil Lr2 and a capacitor Cr2, a microprocessor MP2, a memory MEM2, a modulation circuit MDC2, an oscillator OSC2 delivering an excitation signal S2 applied to the antenna circuit LCR2 through the modulation circuit MDC2, and a data extraction circuit EXTC2 connected to the antenna circuit LCR2.

The reader RD1 is switched to passive operating mode here by a bit or flag Bm stored in a register REG1 the output of which is connected to an input E1 of the microprocessor MP1. The value of the flag Bm is detected by polling (cyclic reading of the register) or by interruption. The microprocessor MP1 switches to the passive mode when the flag Bm has a determined value, such as "1" for example. In practice, the value of the flag Bm can be changed by a switch or a push button (not shown) accessible manually on the box of the reader RD1 or be modified by the microprocessor MP1 itself. The microprocessor MP1 may for example be programmed to switch to passive mode at certain times of the day or month, corresponding to the reading of data logged in the memory MEM1. The switching to passive mode can also be initiated in a menu presented to the user in which the two options modes of operation are presented. This embodiment is applicable to portable readers provided to read fixed readers arranged in terminals by going into passive mode.

The operation of the reader RD1 in passive mode first of all results in the absence of sending the magnetic field FLD1 which is the only permanent magnetic field existing between the readers RD1 and RD2 being the magnetic field FLD2 sent by the reader RD2. To make the antenna circuit LCR1 of the reader RD1 "silent", the signal CMD is set to 0 (port P5) and the ports P1 to P4 are set to the high impedance state HZ. The signal S1 is therefore blocked by the logic gate LG and does not reach the transistor T1 of the modulation circuit MDC1 because the gate of transistor T1 is maintained on 0 by the output of the gate LG. In one variation, the microprocessor MP1 maintains the ports P1 to P4 at 0, such that the transistor T1 also remains blocked independently of the signal applied to its gate.

Examples of sending or receiving data in passive mode will now be described in relation with FIGS. 4A to 4E. The left-hand side of these figures relates to receiving data by the reader RD1 and the right-hand side of these figures relates to sending data by the reader RD1.

A—Receiving Data by the Reader RD1:

Advantageously, data sent by the reader RD2 can be read by means of the data extraction circuit EXTC1 which, due to its structure and its arrangement, is capable of extracting both a load modulation signal sent by a contactless integrated circuit (signal SX1 described above) and an amplitude modulation signal.

Figures 4A, 4B:
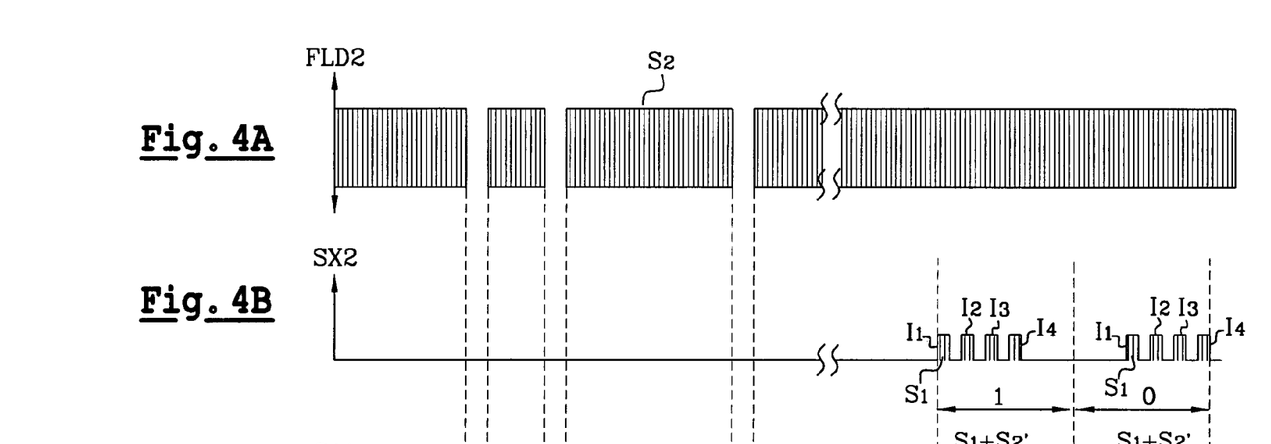
FIGS. 4A to 4E are timing diagrams of electric signals showing the operation of the reader in passive mode, during a communication with another reader.
Figures 4C, 4D:
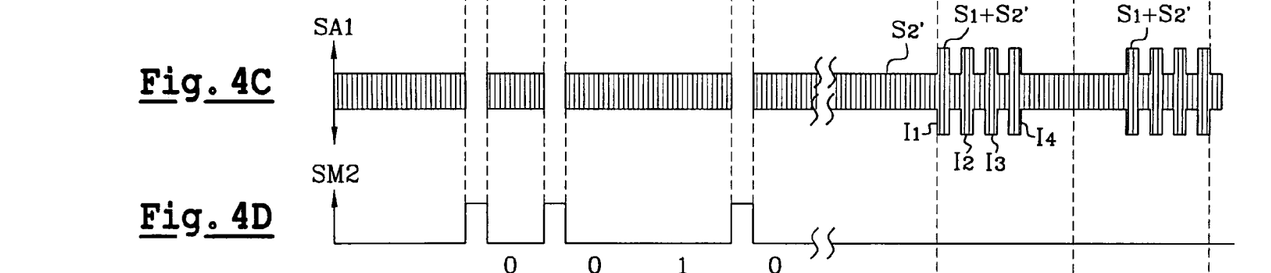

This can be seen by observing FIGS. 4A and 4C, which respectively represent the magnetic field FLD2 sent by the reader RD2 and the antenna signal SA1 appearing by induction in the antenna circuit LCR1 of the reader RD1. In FIG. 3A, it can be seen that the amplitude of the field FLD2 has modulation troughs (of 100% or 10% according to the coding chosen). The envelope of the magnetic field FLD2 is the image of the amplitude modulation signal SM2 (FIG. 4D) applied by the microprocessor MP2 to its modulation circuit MDC2. In FIG. 4C, it can be seen that the antenna signal SA1 copies the amplitude variations of the field FLD2, such that the envelope of the antenna signal SA1 is also the modulation signal SM2. To extract the envelope of the antenna signal SA1, the microprocessor MP1 selects the low-pass filter LPF1 by setting the port P7 to "1". The carrier at 13.56 MHz is removed by the filter LPF2 at the input of the amplifier element T2, and any residual frequencies are eliminated by the filter LPF1. The amplitude modulation signal SM2 is therefore found again on the port P8 of the microprocessor MP1 after being transformed by the amplifier AMP1 and the trigger circuit TRG1.

The microprocessor MP1 decodes the modulation signal SM2 by means of the program PGP1 mentioned above, which contains decoding algorithms provided for the contactless integrated circuits, and deduces the data sent by the reader RD2 from it.

B—Sending Data to the Reader RD2 by Load Modulation:

Here, the object of the present invention is to cause a load modulation signal SX2 to appear in the antenna circuit LCR2 of the reader RD2, without having to add a load modulation switch (of the type of switch TM present at the terminals of the antenna circuit of the integrated circuit CIC) in parallel with the antenna circuit LCR1 of the reader RD1.

For that purpose, the idea of the present invention is to apply a load modulation signal SX2 with two states to the antenna circuit LCR1 by means of the modulation circuit MDC1. The load modulation signal is capable of causing a disturbance of the magnetic field FLD2 sent by the reader RD2. This disturbance must be passed onto the antenna circuit LCR2 with sufficient strength to be detected by the data extraction circuit EXTC2 of the reader RD2.

Table 1 below describes the various states of the output of the circuit MDC1 according to the control signals CMD and SM1 applied thereto. The signal delivered by the circuit MDC1 is here designated SX2 to distinguish it from the signal S1 delivered by the same circuit when the reader is operating in active mode. The output states are referenced "A" to "F" in the left-hand side column. According to the findings and experiments conducted by the applicant, three load modulation methods MDC1 can be chosen to cause a disturbance of the magnetic field FLD2 that can be detected by the reader RD2 as a load modulation signal.

The first method is summarised in Table 2 below and involves alternating the state A and the state B, such that the load modulation signal SX2 delivered by the circuit MDC1 comprises an alternation of "0" and "1". From an electrical point of view, the application of a "0" to the antenna circuit LCR1 amounts to connecting the same to the ground GND (through the capacitor C1) or to any reference potential representing the logic "0". The application of a "1" to the antenna circuit amounts to applying (again through the capacitor C1) the direct supply voltage Vcc of the microprocessor MP1 to the same, or any other direct voltage representing the logic "1".

The second method is summarized in Table 3 below and involves alternating the state A and the state C, such that the load modulation signal SX2 delivered by the circuit MDC1 comprises an alternation between the state "0" (ground or reference potential) and the high impedance state HZ. The application of the high impedance state HZ amounts to putting the antenna circuit LCR1 into an open circuit condition.

The third method is summarized in Table 4 below and involves alternating the state D and the state E such that the load modulation signal SX2 delivered by the circuit MDC1 comprises an alternation between the state "0" (ground) and the alternating excitation state of the antenna circuit LCR1 by means of the signal S1 delivered by the oscillator OSC1.

TABLE 1 modulation possibilities offered by the circuit MDC1

| State | CMD | SM1 | Signal SX2 delivered by the circuit MDC1 |
|---|---|---|---|
| A | 0 | 0 | 0 |
| B | 0 | 1 | 1 |
| C | 0 | HZ | HZ |
| D | 1 | 0 | 0 |
| E | 1 | 1 | S1 (13.56 MHz) |
| F | 1 | HZ | HZ |

TABLE 2

(charge modulation-method 1)

| State | CMD | SM1 | SX2 |
|---|---|---|---|
| A | 0 | 0 | 0 |
| B | 0 | 1 | 1 |

TABLE 3

(charge modulation-method 2)

| State | CMD | SM1 | SX2 |
|---|---|---|---|
| A | 0 | 0 | 0 |
| C | 0 | HZ | HZ |

TABLE 4

(charge modulation-method 3)

| State | CMD | SM1 | SX2 |
|---|---|---|---|
| D | 1 | 0 | 0 |
| E | 1 | 1 | S1 (13.56 MHz) |

According to tests conducted by the applicant, these three methods cause a disturbing signal to appear in the antenna circuit LCR2 of the reader RD2 which is detected by the data extraction circuit EXTC2 of the reader RD2 and which, after filtering of its component at about 13.56 MHz by the extraction circuit EXTC2, gives a signal SX2' that is equivalent to a classical load modulation signal.

The third method has the advantage of offering a maximum communication distance that is clearly greater than the first two methods, as the alternating signal pulses S1 applied to the antenna circuit LCR1 cause magnetic field pulses FLD1 to be sent which are detected by the reader RD2 at a greater distance than disturbances due to a passive load modulation. By comparison with a classical load modulation, which is purely passive, the disturbance of the magnetic field obtained according to the third method can be qualified as "pseudo active load modulation" due to the sending of the alternating magnetic field pulses. This third method therefore constitutes the preferred embodiment of the present invention, although the other methods are not however excluded from the present invention.

Furthermore, it can be seen in Table 4 that the delivery of a load modulation signal SX2 comprising an alternation of "0" and of pulses of the signal S1, does not require the control signal CMD to be set to 0. The logic gate LG can therefore be removed in this embodiment and the signal S1 can be constantly applied to the gate of the modulation transistor T1.

FIG. 4B represents the aspect of the signal SX2 when data are sent in accordance with Manchester coding and by applying the third load modulation method. Sending a "1" results in a series of pulses I1, I2 . . . followed by an absence of pulses and sending a "0" results in an absence of pulses followed by a series of pulses I1, I2 . . . I4 etc. (I1–I4). The pulses I1–I4 are sent at the frequency of 847 KHz (load modulation sub-carrier), calculated by the microprocessor MP1 by division of the clock signal H (signal S1). Each pulse I1–I4 is constituted by a series of alternations of the signal S1.

FIG. 4C, which represents the antenna signal SA1, demonstrates that the effect of the application of each pulse I1–I4 to the antenna circuit LCR1 is to increase the amplitude of the antenna signal SA1, which corresponds to sending a magnetic field FLD1 pulse. While pulses I1–I4 are being sent, the antenna signal SA1 comprises a combination of the excitation signal S1 sent by the oscillator OSC1 (predominant) and of an induced signal S2' (negligible before S1) that is the image of the excitation signal S2 sent by the oscillator OSC2 of the reader RD2. Outside periods of sending pulses, the antenna signal SA1 is formed solely by the induced signal S2' and its amplitude depends on the rate of inductive coupling between the two readers.

Figure 4E:
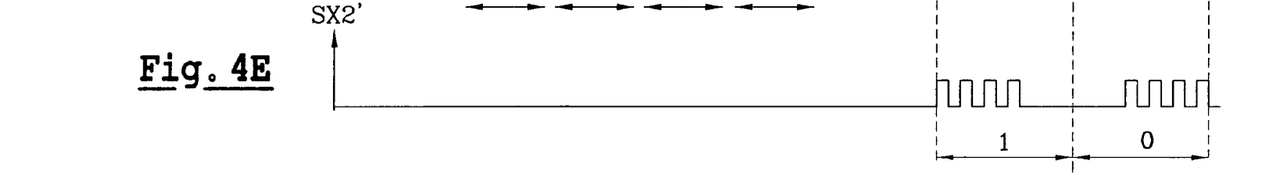

The pulses I1–I4 are passed onto the antenna circuit of the reader RD2 and are extracted by the circuit EXTC2, which delivers the signal SX2' represented in FIG. 4E to the microprocessor MP2. The signal SX2' is the envelope of the signal SX2 (i.e. the envelope of the pulses I1–I4 after filtering the component S1 at 13.56 MHz) and is equivalent to a classical load modulation signal, such as the signal SX1 represented in FIG. 3D for example. The signal SX2' is decoded by the microprocessor MP2, which deduces the data DT sent by the reader RD1 therefrom.

It will be understood by those skilled in the art that different variations and embodiments of this reader according to the present invention may be implemented. Although reference has been made above to the ISO standards 14443-2/A or 14443-2/B, a reader according to the present invention may be provided to operate in passive mode in accordance with any other communication protocol based on the load modulation principle, particularly the protocol ISO 1569 mentioned in the preamble. A reader according to the present invention may also be provided to operate exclusively in passive mode. In this case, it is no longer a "reader" within the conventional meaning of the term but a device provided to read data in a contactless integrated circuit reader, which is neither a contactless integrated circuit reader nor a contactless integrated circuit (due to its ability to generate an alternating magnetic field). Moreover, although above it was indicated that a reader according to the present invention stops sending a magnetic field when it switches to passive mode, a magnetic field could, however, be sent outside periods of sending data (i.e. the periods of applying the load modulation signal with two states SX2). However, in practice, sending a magnetic field seems to be unnecessary when the reader is operating in passive mode and conversing with another reader.

Therefore, a reader or a device according to the present invention may be used in different applications, particularly in the field of reading data logged by contactless readers arranged in fixed terminals.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device in order to transmit/receive data by inductive coupling comprising:
   an antenna circuit to generate a magnetic field; and
   an excitation circuit for delivering an alternating excitation signal to the antenna circuit,
   the device being configured to operate in a first operating mode and a second operating mode,
   when in the first operating mode, the device modulates the excitation signal when data is transmitted, and
   when in the second operating mode, the device applies a load modulation signal with two states to the antenna circuit when data is transmitted, so as to simulate the operation of a contactless integrated circuit, the load modulation signal being configured to disturb a magnetic field generated by another device in order to transmit/receive data by inductive coupling and being configured to be detected by the other device as if the load modulation signal were a load modulation signal applied to an antenna load modulation switch of a contactless integrated circuit.

2. A device according to claim 1, wherein the load modulation signal of the second operating mode comprises data representative pulses of the excitation signal, the duration of each data representative pulse being longer than the period of the excitation signal.

3. A device according to claim 2, wherein the load modulation signal of the second operating mode comprises groups of data representative pulses of the excitation signal, the data representative pulses of a single group being generated at a frequency lower than the frequency of the excitation signal.

4. A device according to claim 1, wherein the load modulation signal of the second operating mode alternates between the following two states:
   logic "0" which is a reference potential, and
   a high impedance state.

5. A device according to claim 1, wherein the load modulation signal of the second operating mode alternates between the following two states:
   logic "0" which is a reference potential, and
   logic "1" which is a direct voltage.

6. A device according to claim 1, wherein the load modulation signal of the second operating mode is controlled by at least one port of a logic circuit.

7. A device according to claim 1, wherein:
in the first operating mode, the device generates the magnetic field in a substantially constant manner including when data is being transmitted and when data is not being transmitted, and data is transmitted by modulating the amplitude of the magnetic field, and
in the second operating mode, the device does not generate the magnetic field when data is not being transmitted.

8. A device according to claim 1, further comprising:
a first extraction circuit that extracts, in the first operating mode, a load modulation signal transmitted by a contactless integrated circuit from a signal present in the antenna circuit; and
a second extraction circuit that extracts from the antenna signal, in the second operating mode, an amplitude-modulated signal transmitted by the other device.

9. A device according to claim 8, wherein first and second extraction circuits comprise a common filter circuit coupled to the antenna circuit.

10. A device according to claim 1, further comprising:
one of a bit and a flag stored in a register to control switching from one of the first and second operating modes to the other of the first and second operating modes.

11. A device according to claim 1, wherein the device is a portable contactless integrated circuit reader.

12. A device according to claim 1, wherein the device is a fixed contactless integrated circuit reader.

13. A method for transferring data from a first contactless integrated circuit reader to a second contactless integrated circuit reader, the first and second readers operating by inductive coupling, each of the first and second readers comprising an antenna circuit that generates a magnetic field and an excitation circuit that delivers an alternating excitation signal to the respective antenna circuit, the method comprising:
the first reader applying a data-carrying signal with two states to the antenna circuit of the first reader when data is to be transmitted to the second reader; and
the second reader receiving the data-carrying signal by inductive coupling and extracting data from the received data-carrying signal.

14. A method according to claim 13, wherein the data-carrying signal with two states is a load modulation signal comprising pulses of an alternating signal, the duration of each pulse being longer than the period of the alternating signal, the load modulation signal being configured to disturb the magnetic field generated by the second reader and being configured to be detected by the second reader as if the load modulation signal were a load modulation signal applied to an antenna load modulation switch of a contactless integrated circuit.

15. A method according to claim 14, wherein the load modulation signal comprises groups of pulses of the excitation signal, the pulses of a single group being generated at a frequency lower than the frequency of the excitation signal.

16. A method according to claim 13, wherein the data-carrying signal with two states is a load modulation signal which alternates between the following two states:
logic "0" which is a reference potential, and
a high impedance state,
the load modulation signal being configured to disturb the magnetic field generated by the second reader and being configured to be detected by the second reader as if the load modulation signal were a load modulation signal applied to an antenna load modulation switch of a contactless integrated circuit.

17. A method according to claim 13, wherein the data-carrying signal with two states is a load modulation signal which alternates between the following two states:
logic "0" which is a reference potential, and
logic "1" which is a direct voltage,
the load modulation signal being capable of disturbing the magnetic field generated by the second reader and of being detected by the second reader as if the load modulation signal were a load modulation signal applied to an antenna load modulation switch of a contactless integrated circuit.

18. A method according to claim 13, wherein the data-carrying signal with two states is the excitation signal with an amplitude modulation, as if the second reader were a contactless integrated circuit.

19. A method according to claim 13, further comprising:
preventing the first reader from generating a magnetic field when the first reader does not transmit data.

20. A method according to claim 13, further comprising:
preventing the second reader from generating a magnetic field when the second reader receives data.

21. A method according to claim 13 further comprising:
providing filter circuitry in the second reader to extract both a load modulation signal transmitted by a contactless integrated circuit from the antenna signal of the reader and the data-carrying signal with two states emitted by the first contactless integrated circuit reader from the antenna signal.

22. A method according to claim 1, comprising setting a bit or a flag in the first reader to cause the first reader to switch in a reader-to-reader operating mode.

23. A method for transferring data from a first contactless integrated circuit reader to a second contactless integrated circuit reader and for transferring data from the second contactless integrated circuit reader to the first contactless integrated circuit reader, the first and second contactless readers operating by inductive coupling, each of the first and second contactless readers including an antenna circuit to generate a magnetic field and an excitation circuit that delivers an alternating excitation signal to the antenna circuit, the method comprising:
when data is transferred from the first to the second reader:
the second reader generating a magnetic field;
the first reader applying a data-carrying load modulation signal with two states to the antenna circuit of the first reader, the load modulation signal disturbing the magnetic field generated by the second reader; and
the second reader extracting the data-carrying load modulation signal from the antenna coil of the second reader and extracting data from the data-carrying load modulation signal; and
when data is transferred from the second to the first reader:
the second reader generating a magnetic field and modulating the amplitude of the magnetic field in accordance with data to be transmitted, and
the first reader receiving an image signal of the amplitude-modulated magnetic field and extracting data from the image signal.

24. A method according to claim 23, wherein the data-carrying load modulation signal comprises data representative pulses of an alternating signal, the duration of each data representative pulse being longer than the period of the alternating signal.

25. A method according to claim 24, wherein the data-carrying load modulation signal comprises groups of data representative pulses of the excitation signal, the data representative pulses of a single group being emitted at a frequency lower than the frequency of the excitation signal.

26. A method according to claim 23, wherein the data-carrying load modulation signal alternates between the following two states:
  logic "0" which is a reference potential, and
  a high impedance state.

27. A method according to claim 23, wherein the data-carrying load modulation signal alternates between the following two states:
  logic "0" which is a reference potential, and
  logic "1" which is a direct voltage.

28. A contactless integrated circuit reader comprising:
  an antenna circuit that generates a magnetic field; and
  an excitation circuit to deliver an alternating excitation signal to the antenna circuit,
  the reader including a first operating mode and a second operating mode,
  when in the first operating mode, the reader is configured to exchange data with a contactless integrated circuit, and
  when in the second operating mode, the reader is configured to exchange data with another contactless integrated circuit reader,
  the reader includes one of a bit and a flag to switch the reader from one of the first and second operating modes to the other of the first and second operating modes.

29. A reader according to claim 28, wherein the reader is configured to apply a load modulation signal with two states to the antenna circuit when the reader operates in the second operating mode and when data is to be transmitted to the other reader.

30. A reader according to claim 29, wherein the reader is configured to apply to the antenna circuit a load modulation signal comprising pulses of an alternating signal, the duration of each pulse being longer than the period of the alternating signal, the load modulation signal being configured to disturb the magnetic field generated by the second reader and being configured to be detected by the second reader as if the load modulation signal were a load modulation signal applied to an antenna load modulation switch of a contactless integrated circuit.

31. A reader according to claim 30, wherein the reader is configured to apply to the antenna circuit a load modulation signal comprising groups of data representative pulses of the excitation signal, the data representative pulses of a single group being emitted at a frequency lower than the frequency of the excitation signal.

32. A reader according to claim 29, wherein the reader is configured to apply to the antenna circuit a load modulation signal which alternates between the following two states:
  logic "0" which is a reference potential, and
  a high impedance state,
  the load modulation signal being configured to disturb the magnetic field generated by the second reader and being configured to be detected by the second reader as if the load modulation signal were a load modulation signal applied to an antenna load modulation switch of a contactless integrated circuit.

33. A reader according to claim 29, wherein the reader is configured to apply to the antenna circuit a load modulation signal which alternates between the following two states:
  logic "0" which is a reference potential, and
  logic "1" which is a direct voltage,
  the load modulation signal being configured to disturb the magnetic field generated by the second reader and being to be detected by the second reader as if the load modulation signal were a load modulation signal applied to an antenna load modulation switch of a contactless integrated circuit.

34. A reader according to claim 28, wherein the reader is configured to modulate the amplitude of the generated magnetic field when the reader operates in the first operating mode and when data is to be transmitted.

35. A reader according to claim 28, wherein the reader is configured not to generate the magnetic field when the reader operates in the second operating mode and when at least one of the following conditions occurs:
  the reader does not transmit data and no data is to be received, and
  the reader receives data from the other reader.

36. A data transmission system comprising a first device and a second device that each exchange data by inductive coupling, each device comprising:
  an antenna circuit that generates a magnetic field;
  an excitation circuit that delivers an alternating excitation signal to the antenna circuit,
  wherein the first device is configured to perform at least one operation in each of the three following groups of operations and the second device is configured to perform at least one complementary operation in each of the three following groups of operations, depending whatever operation is acceptable to the first device:
  operations for transmitting data:
  transmitting data to the other device by applying a load modulation signal with two states to the antenna circuit, the load modulation signal being capable of disturbing the magnetic field generated by the other device and of being detected by the other device as if the load modulation signal were a load modulation signal applied to an antenna load modulation switch of a contactless integrated circuit, and
  transmitting data to the other device by modulating the amplitude of the generated magnetic field, as if the other device were a contactless integrated circuit;
  operations for receiving data:
  not generating the magnetic field when data is to be received from the other device, and
  generating the magnetic field when data is to be received from the other device; and
  operations when no data is to be transmitted and when no data is to be received:
  not generating the magnetic field, and
  generating the magnetic field.

37. A data transmission system according to claim 36, wherein at least one of the first and second devices is configured so that the load modulation signal comprises pulses of the excitation signal, the duration of each pulse being longer than the period of the excitation signal.

38. A data transmission system according to claim 36, wherein at least one of the first and second devices is configured so that the load modulation signal alternates between the following two states:
  logic "0" which is a reference potential, and
  a high impedance state.

39. A data transmission system according to claim 36, wherein at least one of the first and second devices is configured so that the load modulation signal alternates between the following two states:
  logic "0" which is a reference potential, and
  logic "1" which is a direct voltage.

40. A data transmission system according to claim 36, wherein at least one of the first and second devices is a portable contactless integrated circuit reader.

41. A data transmission system according to claim 36, wherein at least one of the first and second devices is a fixed contactless integrated circuit reader.

42. A data transmission system comprising a first device and a second device that each transmit/receive data by inductive coupling, each device comprising:
  an antenna circuit that generates a magnetic field; and
  an excitation circuit that delivers an alternating excitation signal to the antenna circuit,
  wherein the first device is configured to perform at least two of the following operations and the second device is configured to be responsive to at least one such operation when performed by the first device:
  transmitting data to another device by applying a load modulation signal with two states to the antenna circuit, the load modulation signal being capable of disturbing the magnetic field generated by the other device and of being detected by the other device as if the load modulation signal were a load modulation signal applied to an antenna load modulation switch of a contactless integrated circuit;
  transmitting data to another device by modulating the amplitude of the generated magnetic field, as if the other device were a contactless integrated circuit;
  not generating the magnetic field when no data is to be transmitted and when no data is to be received;
  not generating the magnetic field when data is to be received from another device; and
  generating the magnetic field when data is to be received from another device.

43. A data transmission system according to claim 42, wherein at least one of the first and second devices is configured so that the load modulation signal comprises pulses of the excitation signal, the duration of each pulse being longer than the period of the excitation signal.

44. A data transmission system according to claim 42, wherein at least one of the first and second devices is configured so that the load modulation signal alternates between the following two states:
  logic "0" which is a reference potential, and
  a high impedance state.

45. A data transmission system according to claim 42, wherein at least one of the first and second devices is configured so that the load modulation signal alternates between the following two states:
  logic "0" which is a reference potential, and
  logic "1" which is a direct voltage.

46. A data transmission system according to claim 42, wherein at least one of the first and second devices is a portable contactless integrated circuit reader.

47. A data transmission system according to claim 42, wherein at least one of the first and second devices is a fixed contactless integrated circuit reader.

* * * * *

UNITED STATES PATENT AND TRADEMARK OFFICE
CERTIFICATE OF CORRECTION

| | |
|---|---|
| PATENT NO. | : 7,098,770 B2 |
| APPLICATION NO. | : 10/411008 |
| DATED | : August 29, 2006 |
| INVENTOR(S) | : Bruno Charrat et al. |

It is certified that error appears in the above-identified patent and that said Letters Patent is hereby corrected as shown below:

Column 7:

Line 1, "DWVC" should read --DIVC--;

Signed and Sealed this

Fifth Day of December, 2006

JON W. DUDAS
*Director of the United States Patent and Trademark Office*